United States Patent Office 3,773,765
Patented Nov. 20, 1973

3,773,765
s-TRIAZINO[1,2-a][1,4]BENZODIAZEPINE-1,3-
(2H,4H AND 2H,5H)DIONES
Robert Bruce Moffett, Kalamazoo, Mich., assignor to
The Upjohn Company, Kalamazoo, Mich.
No Drawing. Filed Aug. 18, 1971, Ser. No. 172,907
Int. Cl. C07d 55/12
U.S. Cl. 260—248 NS  15 Claims

ABSTRACT OF THE DISCLOSURE s-Triazino[1,2-a][1,4]benzodiazepine-1,3(2H,4H and 2H,5H)diones of the general formula

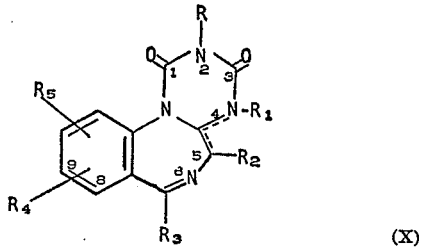

(X)

in which R and $R_1$ are H, alkyl or alkenyl of 1 to 4 carbons; $R_2$ is H, or alkyl of 1 to 3 carbons, OH, lower alkanoyloxy of 2 or 3 carbon atoms and alkoxy of 1 to 3 carbon atoms; $R_3$ is 2-, 3- or 4-pyridyl, 2-pyrimidyl, furyl, pyrryl, thenyl, cycloalkyl with 5 to 7 carbons, cycloalkenyl with 5 to 7 carbons or

$R_4$ and $R_5$ are each H, alkyl of 1 to 3 carbons, halogen, nitro, cyano, trifluoromethyl, alkoxy of 1 to 3 carbons, alkylthio of 1 to 3 carbons, alkyl sulfinyl of 1 to 3 carbons, alkyl sulfonyl of 1 to 3 carbons, amino, alkanoylamino of 2 or 3 carbons, or dialkylamino with 1- to 3-carbon alkyls; are made by heating a compound:

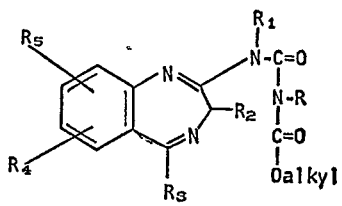

to effect ring closure.

The new products, including their pharmacologically acceptable addition salts are useful for their calming effect, for reducing anxiety and aggressive behavior, as sedatives, hypnotics, tranquilizers, and anticonvulsants and muscle relaxants in mammals and birds, and also as feed additives for increasing growth rate and feed efficiency of livestock and poultry, milk production in the mammalian species and egg production in the avian species.

SUMMARY OF THE INVENTION

Field of invention

This invention relates to new organic compounds, s-triazino[1,2-a][1,4]benzodiazepine-1,3(2H,4H and 2H,5H)diones and the processes and intermediates therefor. The invention also includes the pharmaceutically acceptable acid addition salts.

The compounds of the invention, processes, and intermediates for their production can be illustratively represented as follows:

SCHEME I

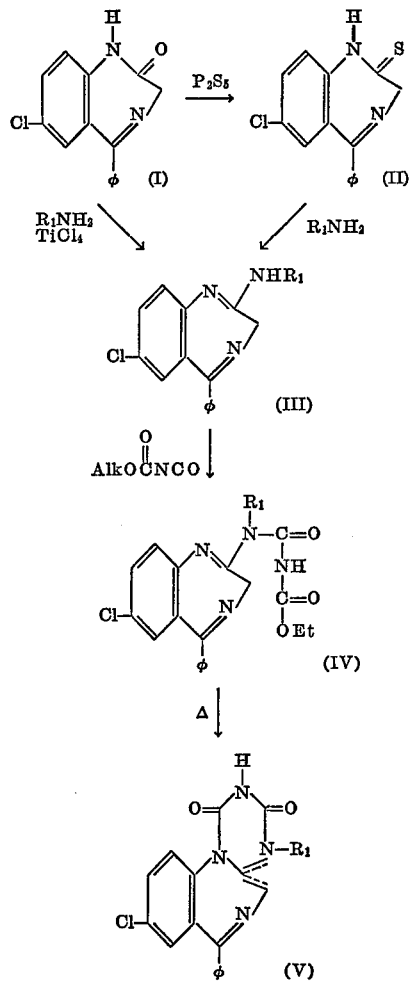

The foregoing scheme is illustrative of the preparation of representative members of X. The reaction conditions for I→II, II→III and I→III are known in the literature. The steps III→IV and IV→V are novel. In the latter, when $R_1$ is H the double bond migrates to the 4–4a position on closure, whereas when $R_1$ has any other value assigned above, the double bond appears in the 4a–5 position. The "alk" of the carbalkoxy isocyanate reagent

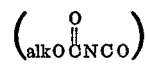

cn be any alkyl group of 1 to 8 or more carbons.

X can be prepared alternatively by the following reaction scheme:

SCHEME II

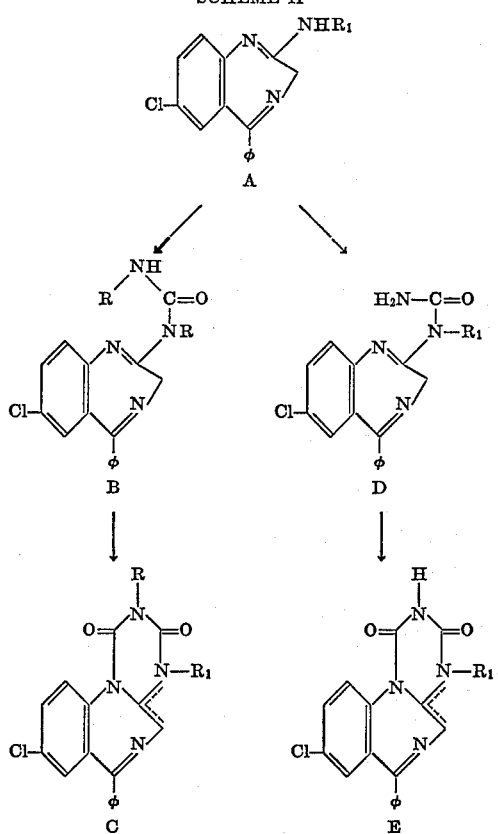

In the foregoing reactions, the step of A→B is known in the literature, the rest of the steps being novel. The step of A→D can be carried out with the aid of a carbamylating agent. The step of D→E can be carried out with ClCOCl, 1,1'-carbonyldiimidazole or 1,1'-carbonylditriazole or (φO)₂CO. The step of B→C can be carried out in the same manner as D→E.

The following reaction scheme shows the substitution of the fused compound V as a typical subgenus of X, for the purpose of introducing the substituents R and R₁. Reaction Scheme I provides in compound III a substituent moiety R₁ present in the starting material, which remains as a substituent in the final product in the 4-position. By the following scheme the substituent R can be introduced into this compound. When R₁ is H in compound III, the following scheme provides for introduction of the substituent moiety R.

SCHEME III

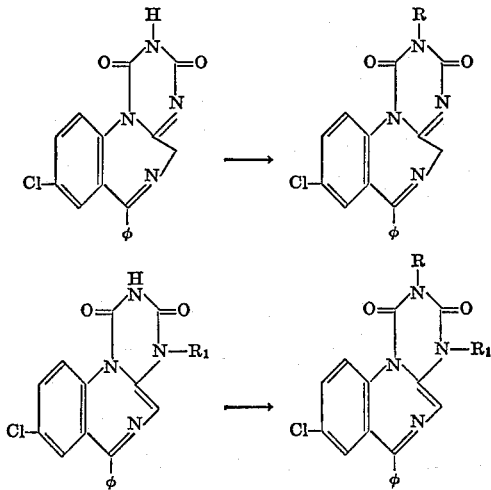

The substitution can be effected by means of a diazoalkane, a trialkyloxonium fluoroborate or with a halide, sulfate fluorosulfonate, aryl or alkyl sulfonate of the moiety to be introduced in the presence of a base such as TlOEt, NaH, NaOEt, NaOH, Na₂CO₃, or a tertiary amine.

In the foregoing reaction steps, the reaction conditions in general are as follows:

For the step III→IV the reaction is carried out in an inert solvent preferably below room temperature.

In the step IV→V the reaction is carried out by heating neat or by refluxing in a solvent, boiling between 100 and 200° C., such as xylene, diethyleneglycol dimethyl ether, etc.

In the step A→D the reaction is carried out in an inert solvent below room temperatures or with mild heating as needed, suitable solvents include tetrahydrofuran, benzene, ethyleneglycol dimethyl ether, chloroform, etc.

In the step B→C and in step D→E the reaction is carried out in an inert solvent preferably below room temperature, suitable solvents are tetrahydrofuran, chloroform, toluene, ethyleneglycol dimethyl ether, etc.

The substitution reaction of Scheme III is carried out in an inert solvent below room temperature or with mild heating if necessary to complete the reaction, suitable solvents, tetrahydrofuran, dimethylformamide, chloroform, diethyl ether, etc.

The course of all the above reactions may be followed by the IR, NMR, TlC, or GlC.

Suitable materials for use in Scheme I as starting material are known in the art. The starting compound corresponding to III of this scheme is a 2-amino-5-phenyl-3H-1,4-benzodiazepine, and can be prepared in known manner, as will be explained below.

The term "halogen" includes fluorine, chlorine, bromine and iodine. The term alkyl is exemplified by methyl, ethyl, propyl and isopropyl, the term alkoxy is exemplified by methoxy, ethoxy, propoxy and isopropoxy. The term alkylthio is exemplified by methylthio, ethylthio, propylthio and isopropylthio. The term alkylsulfinyl is exemplified by methylsulfinyl, ethylsulfinyl, propylsulfinyl and isopropylsulfinyl. The term alkylsulfonyl is exemplified by methylsulfonyl, ethylsulfonyl, propylsulfonyl and isopropylsulfonyl. The term alkanoylamino is exemplified by formylamino, acetylamino, propionylamino and isopropionylamino. The term dialkylamino is exemplified by dimethylamino, diethylamino, methylethylamino, methylpropylamino, ethylpropylamino, dipropylamino, diisopropylamino and the like. The term alkenyl is exemplified by vinyl, 1-propenyl, allyl and isopropenyl. The term cycloalkyl is exemplified by cyclopentyl, cyclohexyl and cycloheptyl. The term cycloalkenyl is exemplified by 1-cyclopentenyl, 1-cyclohexenyl, 1-cycloheptenyl, 2-cyclopentenyl, 2-cyclohexenyl, 2-cycloheptenyl, 3-cyclopentenyl, 3-cyclohexenyl, 3-cycloheptenyl and 4-cycloheptenyl.

The novel compounds X exist in either the non-protonated (free base) form or in the protonated (acid addition salt) form, depending on the pH of the environment. They form stable protonates, i.e., pharmacologically acceptable acid addition salts, on acidification of the free base with suitable pharmacologically acceptable acids, for example, hydrochloric, hydrobromic, sulfuric, phosphoric, nitric, acetic, propionic, palmitic, benzoic, salicylic, hexynoic, phenylbutyric, naphthoic, glycolic, succinic, nicotinic, tartaric, maleic, malic, pamoic methanesulfonic cyclohexanesulfonic, citric and lactic acids, and the like. Conversely, the free bases of the novel compounds of Formula X can be obtained from a salt (e.g., from the hydrochloride or sulafte salt) by neutralization with a base such as sodium hydroxide, extracting with an immiscible solvent, for example chloroform, drying the extract, for example with anhydrous sodium sulfate, and removing the solvent by evaporation.

The novel compounds of Formulae X, the N-oxide, and the pharmacologically acceptable acid addition salts thereof have sedative, hypnotic, anticonvulsant, tranquilizing and muscle relaxant effects in mammals and birds, and as feed additives for increasing the growth rate and feed efficiency of livestock and poultry, milk production during lactation in the mammalian species and egg production in the avian species.

End compounds IV such as V appearing in the Schemes, above are subclasses of the general Formula X, first appearing in this specification (the abstract) and are used to illustrate the synthesis of the broad class encompassed by the general formula.

As disclosed above, the invention also includes compounds of the formula:

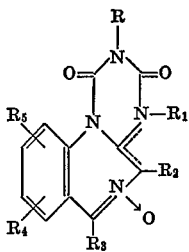

These N-oxides are obtained by reacting a compound of Formula X with a peracid, such as peracetic acid, perphthalic acid, perbenzoic acid, m-chloroperbenzoic acid and the like, in a suitable organic solvent such as a lower alkanol, e.g., methanol, ethanol, propanol, isopropanol and butanol; chloroform, methylene chloride and the like at a temperature within the range of from about 0° C. to about 25° C. for a period of from about 6 to 48 hours. The N-oxides are recovered from the reaction medium and purified by conventional methods such as chromatography and/or crystallization.

DESCRIPTION OF THE PREFERRED EMBODIMENTS

The sedative tranquilizing effects of X and the salts and N-oxides as described above are shown by the following tests on laboratory animals. Examples are:

Chimney test: [Med. Exp. 4, 11 (1961)]: The effective intraperitoneal dosage for 50% of mice ($ED_{50}$) is 1.1 mg./kg. The test determines the ability of mice to back up and out of a vertical glass cylinder within 30 seconds. At the effective dosage, 50% of the mice failed doing it.

Dish test: Mice in Petri dishes (10 cm. diameter, 5 cm. high, partially embedded in wood shavings), climb out in a very short time, when not treated. Mice remaining in the dish for more than 3 minutes indicates tranquilization. $ED_{50}$ equals the dose of test compounds at which 50% of the mice remain in the dish. The $ED_{50}$ (intraperitoneal administration) in this test was 0.18 mg./kg. for the product of Example 3.

Pedestal test: The untreated mouse leaves the pedestal in less than a minute to climb back to the floor of the standard mouse box. Tranquilized mice will stay on the pedestal for more than 1 minute. The $ED_{50}$ (intraperitoneal administration) is 1.8 mg./kg. for the product of Example 3.

Nicotine antagonism test: Mice in a group of 6 are injected with the test compound, 9-chloro-1-methyl-7-phenylpyrimido[1,2-a][1,4]benzodiazepin-3-(5H)-one. Thirty minutes later the mice including control (untreated) mice are injected with nicotine salicylate (2 mg./kg.). The control mice show overstimulation, i.e., (1) running convulsions followed by (2) tonic extensor fits: Followed by (3) death. An intraperitoneal dosage of 0.9 mg./kg. of the above test compound protected 50% of the mice against (2) and (3) ($ED_{50}$).

Antagonism to strychnine (as sulfate): The effective dosage $ED_{50}$ of 9-chloro-1-methyl-7-phenylpyrimido-[1,2-a][1,4]benzodiazepin-3(5H)-one is 7 mg./kg. orally in mice. The test consists in orally administering into groups of 6 mice the test compound, 9-chloro-1-methyl-7-phenylpyrimido[1,2-a][1,4]benzodiazepin-3(5H)-one, and 30 minutes later 3 mg./kg. strychnine sulfate intraperitoneally. The survivors after 4 hours reflect the activity of the compound as a muscle relaxant and antispasmodic. A dosage of 3 mg./kg. of strychnine sulfate is routinely fatal to all the control mice.

The pharmaceutical forms contemplated by this invention include pharmaceutical compositions suited for oral, parenteral and rectal use, e.g., tablets, powder packets, cachets, dragees, capsules, solutions, suspensions, sterile injectable forms, suppositories, bougies, and the like. Suitable diluents or carriers such as carbohydrates (lactose, cornstarch, and the like), proteins, lipids, calcium phosphate, stearic acid, methylcellulose and the like can be used as carriers or for coating purposes. Oil, e.g., coconut oil, sesame oil, safflower oil, cottonseed oil, peanut oil can be used for preparing solutions or suspensions of the active drug. Sweetening, coloring, and flavoring agents can be added.

For mammals and birds, food premixes, with starch, oatmeal, dried fishmeat, fishmeal, flour and the like can be prepared. These are then incorporated into an animal feed.

As feed additives the compounds of Formulae I, II and III can be used in dosages of 0.003 mg. to 50 mg./animal/day in a feed to increase growth, feed consumption and feed efficiency in livestock and poultry, milk production in the mammalian species and egg production in avian species.

As tranquilizer the compounds of Formula X can be used in dosages of 0.01 mg.–2.0 mg./kg. in oral or injectable preparations as described above, to alleviate tension and anxiety in mammals, or birds, such as e.g., occurs when animals are in travel.

Other acid addition salts of the compounds of Formula X can be made such as the fluosilicic acid addition salts which are useful mothproofing compounds or the trichloroacetates useful as herbicides against Johnson grass, Bermuda grass, yellow foxtail and green foxtail, and quack grass.

Representative starting compounds corresponding to III are:

2-amino-5-phenyl-3H-1,4-benzodiazepine;
2-amino-7-chloro-5-phenyl-3H-1,4-benzodiazepine;
2-amino-6-chloro-5-(m-bromophenyl)-3H-1,4-benzodiazepine;
2-amino-8-chloro-5-phenyl-3H-1,4-benzodiazepine;
2-amino-7-bromo-5-phenyl-3H-1,4-benzodiazepine;
2-amino-7-chloro-5-(3,4-dimethylphenyl)-3H-1,4-benzodiazepine;
2-amino-5-(2-methyl-4-methoxyphenyl)-3H-1,4-benzodiazepine;
2-amino-9-bromo-5-phenyl-3H-1,4-benzodiazepine;
2-amino-7-methyl-5-phenyl-3H-1,4-benzodiazepine;
2-amino-7-nitro-5-phenyl-3H-1,4-benzodiazepine;
2-amino-7-fluoro-5-phenyl-3H-1,4-benzodiazepine;
2-amino-7-trifluoromethyl-5-phenyl-3H-1,4-benzodiazepine;
2-amino-9-trifluoromethyl-5-[p-(propionylamino)phenyl]-3H-1,4-benzodiazepine;
2-amino-7-cyano-5-phenyl-3H-1,4-benzodiazepine;
2-amino-8-cyano-5-[p-(trifluoromethyl)phenyl]-3H-1,4-benzodiazepine;
2-amino-7-chloro-5-(p-chlorophenyl)-3H-1,4-benzodiazepine;
2-amino-6-ethylthio-5-(o-bromophenyl)-3H-1,4-benzodiazepine;
2-amino-6,8-dichloro-5-(p-fluorophenyl)-3H-1,4-benzodiazepine;
2-amino-8-propoxy-7-bromo-5-[m-(ethylsulfinyl)phenyl]-3H-1,4-benzodiazepine;
2-amino-9-diisopropylamino-7-methyl-5-[m-(propylsulfonyl)phenyl]-3H-1,4-benzodiazepine;

2-amino-7-bromo-5-(o-fluorophenyl)-3H-1,4-benzodiazepine;
2-amino-3-methyl-5-(o-fluorophenyl)-3H-1,4-benzodiazepine;
2-amino-7-iodo-5(o-fluorophenyl)-3H-1,4-benzodiazepine;
2-amino-7-chloro-5-(2,6-difluorophenyl)-3H-1,4-benzodiazepine;
2-amino-7-trifluoromethyl-5-(2,6-difluorophenyl)-3H-1,4-benzodiazepine;
2-amino-3-methyl-5-(p-fluorophenyl)-3H-1,4-benzodiazepine;
2-amino-7-nitro-5-(o-iodophenyl)-3H-1,4-benzodiazepine;
2-amino-8-amino-5-(o-chlorophenyl)-3H-1,4-benzodiazepine;
2-amino-7-bromo-5-(o-bromophenyl)-3H-1,4-benzodiazepine;
2-amino-7-methylsulfinyl-5-(o-fluorophenyl)-3H-1,4-benzodiazepine;
2-amino-7-methyl-5-(o-chlorophenyl)-3H-1,4-benzodiazepine;
2-amino-7-methylthio-5-phenyl-3H-1,4-benzodiazepine;
2-amino-7-cyano-5-(o-chlorophenyl)-3H-1,4-benzodiazepine;
2-amino-7-chloro-5-(m-methoxybenzyl)-3H-1,4-benzodiazepine;
2-amino-3,6,8-trimethyl-5-(o-chlorophenyl)-3H-1,4-benzodiazepine;
2-amino-9-propylsulfonyl-7-methyl-5-phenyl-3H-1,4-benzodiazepine;
2-amino-7-trifluoromethyl-5-(o-chlorophenyl)-3H-1,4-benzodiazepine;
2-amino-7-dimethylamino-5-phenyl-3H-1,4-benzodiazepine;
2-amino-7-fluoro-5-(o-chlorophenyl)-3H-1,4-benzodiazepine;
2-amino-7,8-dicyano-5-[p-(methylsulfonyl)phenyl]-3H-1,4-benzodiazepine;
2-amino-6,9-dichloro-5-(p-isopropylphenyl)-3H-1,4-benzodiazepine;
2-amino-6-methoxy-5-(2,4-diethoxyphenyl)-3H-1,4-benzodiazepine;
2-amino-9-sulfonamido-5-[p-(trifluoromethyl)phenyl]-3H-1,4-benzodiazepine;
2-amino-6,8-diethyl-5-(m-ethylphenyl)-3H-1,4-benzodiazepine;
2-amino-6-nitro-5-(o-cyanophenyl)-3H-1,4-benzodiazepine;
2-amino-7,9-bis(dipropylamino)-5-(o-nitrophenyl)-3H-1,4-benzodiazepine;
2-amino-9-acetylamino-5-(p-cyanophenyl)-3H-1,4-benzodiazepine;
2-amino-5-(o-chlorophenyl)-3H-1,4-benzodiazepine;
2-(methylamino)-7-chloro-5-phenyl-3H-1,4-benzodiazepine;
2-(ethylamino)-7-chloro-5-phenyl-3H-1,4-benzodiazepine;
2-(allylamino)-7-chloro-5-phenyl-3H-1,4-benzodiazepine;
2-((methylamino)-7-chloro-5-(o-chlorophenyl)-3H-1,4-benzodiazepine;
2-(2-methylallylamino)-7-chloro-5-(o-chlorophenyl)-3H-1,4-benzodiazepine;
2(-methylamino)-7-(trifluoromethyl)-5-phenyl-3H-1,4-benzodiazepine;
2-(isopropylamino)-7-nitro-5-(2,6-difluorophenyl)-3H-1,4-benzodiazepine;
2-methylamino-5-(o-chlorophenyl)-3H-1,4-benzodiazepine;
2-(allylamino)-7-chloro-3,8-dimethyl-5-phenyl-3H-1,4-benzodiazepine;
2-(methylamino)-cyano-5-(o-chlorophenyl)-3H-1,4-benzodiazepine;
2-(methylamino)-7-fluoro-(p-fluorophenyl)-3H-1,4-benzodiazepine;
2-(methylamino)-8-chloro-(o-bromophenyl)-3H-1,4-benzodiazepine;
2-(methylamino)-7-chloro-5-(m-methoxyphenyl)-3H-1,4-benzodiazepine.

In carrying out the process of the invention a selected compound of Formula III, such as typified above is reacted with a carbalkoxyisocyanate (for example, carbethoxyisocyanate, carbomethoxyisocyanate, carbobutoxyisocyanate) in an inert solvent (for example, THF, ethyleneglycol dimethyl ether, diethyleneglycoldimethyl ether, dioxan, benzene, xylene, hexane, DMF) at room temperature or below. Stoichiometric amounts of reactants or an excess of the carbalkoxyisocyanate may be used. The time of reaction may be from a few minutes to several days. The course of the reaction can be followed by removing aliquots for TLC, IR, or NMR. When the reaction is complete the solvent and any excess isocyanate is removed in vacuo and the product (IV) may be purified by crystallization from a suitable solvent (for example, ethanol, benzene, 2-propanol, ethyl acetate, etc.). Compound IV (either crude or purified) can be converted to V by heating neat or in a solvent (for example xylene diethylene glycol dimethyl ether, etc.). The required heating may be a few minutes or several days. The reaction may be followed by TLC, IR or NMR. The product may crystallize from the reaction solvent either at B.P. or on cooling or it may be recovered by evaporating the solvent in vacuo and purifying the residue by crystallization (for example from ethanol, ethyl acetate, xylene, benzene, THF, ethyleneglycol dimethylether, dioxane etc.) or by chromatography.

Reaction A to D may be carried out with a carbamoylating agent (for example, Si(NCO)$_4$, HONO, urea, nitrourea) or with a reactive carbonic acid derivative (for example, phosgene, carbonyldiimidazole, diphenylcarbonate, ethyl chloroformate, diethyl carbonate) followed by reaction with NH$_3$. An inert solvent (for example, diethyl ether, THF, dioxane, ethyleneglycol dimethyl ether, DMF, benzene, hexane, chloroform, etc.). The temperature may be much below room temperature (e.g., −78°) for more reactive reagents or up to 200° for less reactive reagents. The resulting D may be purified by crystallization or the crude product may be converted to E with a reactive carbonic acid derivative (see above).

Reaction A to B may be carried out using the requisite alkyl or alkenyl isocyanate under conditions similar to those described above for III to IV.

Reaction B to C can be carried out as described for D to E.

The reactions of Scheme III using typical reactants, made as illustrated in the foregoing directions for making V and in the following examples, can be carried out by dissolving the reactant in an inert solvent (for example THF, DMF, ethyleneglycol dimethyl, ether, dioxane, benzene, diethyl ether, CH$_2$Cl$_2$, etc.) and adding, preferably, under N$_2$ at or below room temperature, one equivalent of base (see above for suitable bases). Then one or more equivalents of the alkylating agent is added and the mixture may be much below room temperature (e.g., −78°) (or with mild heating) until the reaction is complete (a few minutes or several days depending on the reactivity of the reagent used). The course of the reaction may be followed by TLC, IR, or NMR. If a diazoalkane or a trialkyloxonium fluoborate is used no base is necessary.

The product may be recovered by filtering from insoluble salt of the base used (if present), evaporating the solvent, and purifying the residue by crystallization or chromatography.

When crystallized from the reaction mixture or when purified by recrystallization, the compounds of this invention occasionally are separated as solvates. Ordinarily they can be recovered free of the solvate by heating under reduced pressure or by other methods known in the art.

The presence of the solvate moiety does not interfere with the biological properties of the compounds.

The following preparations and examples are illustrative of the processes and products of the present invention.

PREPARATION 1

1-(7-chloro-5-phenyl-3H-1,4-benzodiazepin-2-yl)-3-(ethoxycarbonyl)-urea

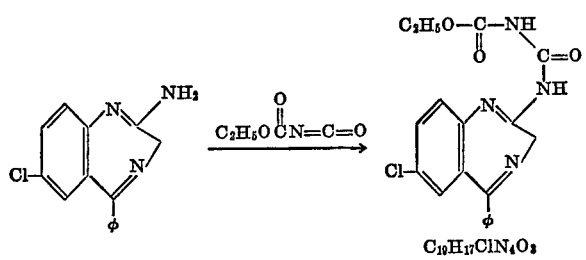

A warm solution of 10.76 g. (0.04 mole) of 2-amino-7-chloro-5-phenyl-3H-1,4-benzodiazepine in 400 ml. of tetrahydrofuran was cooled to about —76° by Dry Ice-acetone under $N_2$. To this was slowly added with stirring during 15 min. 11.5 ml. (0.1 mole) of carbethoxy isocyanate. The solution was stirred at —76° for 3 hrs. and evaporated in vacuo below 0°. Xylene was added and evaporated in vacuo at 0°. The residue was dissolved in 250 ml. of phH, filt. hot, concd. to 200 ml. and cooled giving white solid which was recrystallized from 300 ml. of EtOH yielding 11.2 g. (73%) of white crystals, M.P. 179–180.5°. IR and NMR support the proposed structure.

*Analysis.*—Calcd. for $C_{19}H_{17}ClN_4O_3$ (percent): C, 59.29; H, 4.45; Cl, 9.21; N, 14.57. Found (percent): C, 59.17; H, 4.26; Cl, 9.24; N, 14.37.

Substitution of 2-amino-7-chloro-5-phenyl-3H-1,4-benzodiazepine;
2-amino-7-nitro-5-phenyl-3H-1,4-benzodiazepine;
2-amino-7-fluoro-5-phenyl-3H-1,4-benzodiazepine;
2-amino-7-chloro-5-(o-chlorophenyl)-3H-1,4-benzodiazepine;
2-amino-3-methyl-5-(o-fluorophenyl)-3H-1,4-benzodiazepine;
2-amino-7-chloro-5-(2,6-difluorophenyl)-3H-1,4-benzodiazepine;
2-amino-7-trifluoromethyl-5-(2,6-difluorophenyl)-3H-1,4-benzodiazepine;
2-amino-7-bromo-5-(o-bromophenyl)-3H-1,4-benzodiazepine;
2-amino-7-cyano-5-(o-chlorophenyl)-3H-1,4-benzodiazepine;
2-amino-7-chloro-5-(m-methoxyphenyl)-3H-1,4-benzodiazepine;
2-amino-7-trifluoromethyl-5-(o-chlorophenyl)-3H-1,4-benzodiazepine;
2-amino-5-(o-chlorophenyl)-3H-1,4-benzodiazepine;

in the process of the above experiment can produce 1-(7-nitro-5-phenyl-3H-1,4-benzodiazepine-2-yl)-3-(ethoxycarbonyl)-urea;
1-(7-fluoro-5-phenyl-3H-1,4-benzodiazepine-2-yl)-3-(ethoxycarbonyl)-urea;
1-[3-methyl-5-(o-fluorophenyl)-3H-1,4-benzodiazepine-2-yl]-3-(ethoxycarbonyl)-urea;
1-[7-chloro-5-(2,6-difluorophenyl)-3H-1,4-benzodiazepine-2-yl]-3-(ethoxycarbonyl)-urea;
1-[7-trifluoromethyl-5-(2,6-difluorophenyl)-3H-1,4-benzodiazepine-2-yl]-3-(ethoxycarbonyl)-urea;
1-[7-bromo-5-(o-bromophenyl)-3H-1,4-benzodiazepine-2-yl]-3-(ethoxycarbonyl)-urea;
1-[7-cyano-5-(o-chlorophenyl)-3H-1,4-benzodiazepine-2-yl]-3-(ethoxycarbonyl)-urea;
1-[7-trifluoromethyl-5-(o-chlorophenyl)-3H-1,4-benzodiazepine-2-yl]-3-(ethoxycarbonyl)-urea;
1-[5-(o-chlorophenyl)-3H-1,4-benzodiazepine-2-yl]-3-(ethoxycarbonyl)-urea;

respectively.

PREPARATION 2

1-carbethoxy-3-(7-chloro-5-phenyl-3H-1,4-benzodiazepin-2-yl)-3-methylurea

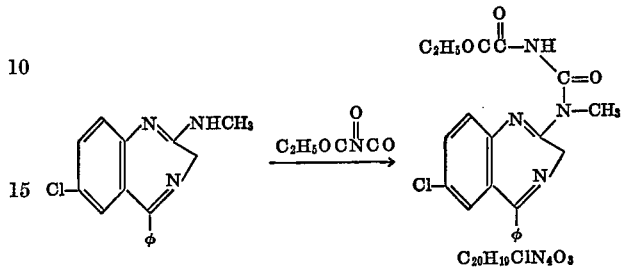

A solution of 5.68 g. (0.02 mole) of 7-chloro-2-(methylamino)-5-phenyl-3H-1,4-benzodiazepine in 200 ml. of THF was cooled under $N_2$ to about —76° by Dry Ice-acetone. To this was slowly added during 10 min. with stirring 10 ml. (0.08 mole) of carbethoxy isocyanate. The solution was allowed to warm to room temperature and was stirred for 23 hrs. After filtration the solution was evaporated in vacuo below 25°, toluene was added and likewise evaporated giving yellow crystalline solid. IR, NMR, and TLC ($SiO_2$, 5% MeOH in $CHCl_3$) indicate this is mostly the desired compound.

Substitution of 2-(methylamino)-7-chloro-5-(o-bromophenyl)-3H-1,4-benzodiazepine;
2-(allylamino)-7-chloro-5-phenyl-3H-1,4-benzodiazepine;
2-(methylamino)-7-chloro-5-(o-chlorophenyl)-3H-1,4-benzodiazepine;
2-(methylamino)-7-(trifluoromethyl)-5-phenyl-3H-1,4-benzodiazepine;
2-(isopropylamino)-7-nitro-5-(2,6-difluorophenyl)-3H-1,4-benzodiazepine;
2-methylamino-5-(o-chlorophenyl)-3H-1,4-benzodiazepine;
2-(methylamino)-7-chloro-5-(m-methoxyphenyl)-3H-1,4-benzodiazepine;

in the process of the above experiment can produce 1-carbethoxy-3-[7-chloro-5-o-bromophenyl-3H-1,4-benzodiazepine-2-yl]-3-methylurea;
1-carbethoxy-3-(7-chloro-5-phenyl-3H-1,4-benzodiazepine-2-yl)-3-allylurea;
1-carbethoxy-3-[7-chloro-5-(o-chlorophenyl)-3H-1,4-benzodiazepine-2-yl]-3-methylurea;
1-carbethoxy-3-(7-trifluoromethyl-5-phenyl-3H-1,4-benzodiazepine-2-yl)-3-methylurea;
1-carbethoxy-3-[7-nitro-5-(2,6-difluorophenyl)-3H-1,4-benzodiazepine-2-yl]-3-isopropylurea;
1-carbethoxy-3-[5-(o-chlorophenyl)-3H-1,4-benzodiazepine-2-yl]-3-methylurea;
1-carbethoxy-3-[7-chloro-5-(m-methoxyphenyl)-3H-1,4-benzodiazepine-2-yl]-3-methylurea, respectively.

EXAMPLE 1

9-chloro-7-phenyl-s-triazino[1,2-a][1,4]benzodiazepine-1,3(2H,5H)-dione ethylacetate solvate (2:1)

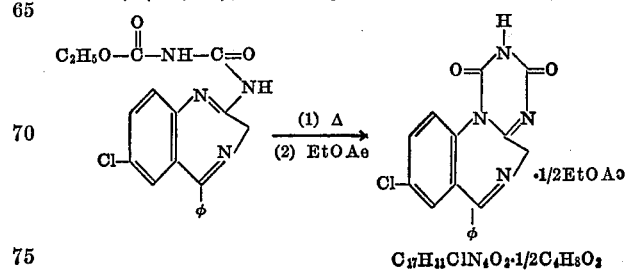

A solution of 7.28 g. (0.019 mole) of 1-(7-chloro-5-phenyl-3H-1,4-benzodiazepin - 2-yl)-3-(ethoxycarbonyl)-urea in 300 ml. of xylene was stirred under reflux under $N_2$ with an air condenser for 8 hrs. After cooling, the solvent was removed in vacuo. The residue was dissolved in 150 ml. of EtOAc, filtered hot, concentrated to 100 ml. and cooled giving 4.45 g. of light yellow crystals, M.P. about 182–222°. This was recrystallized from 350 ml. of EtOAc yielding 2.9 g. (40%) of nearly white fluffy crystals. It was dried at 100°/0.05 mm. for 19 hrs., M.P. about 224–233° (with some sintering from 180° up). TLC ($SiO_2$, 60% EtOAc in cyclohexane) showed only one spot. IR, UV, NMR, and mass spec. support the proposed structure and NMR clearly shows the presence of EtOAc.

*Analysis.*—Calcd. for $C_{17}H_{11}ClN_4O_2 \cdot \frac{1}{2}C_4H_8O_2$ (percent): C, 59.61; H, 3.95; Cl, 9.26; N, 14.64; EtOAc, 11.5. Found (percent): C, 59.78; H, 3.85; Cl, 9.45; N, 14.76; EtOAc (melt solvate) 11.9.

Substitution of 1-(7-nitro-5-phenyl-3H-1,4-benzodiazepine-2-yl)-3-(ethoxycarbonyl)-urea;

1-(7-fluoro-5-phenyl-3H-1,4-benzodiazepine-2-yl)-3-(ethoxycarbonyl)-urea;

1-[3-methyl-5-(o-fluorophenyl)-3H-1,4-benzodiazepine-2-yl]-3-(ethoxycarbonyl)-urea;

1-[7-chloro-5-(2,6-difluorophenyl)-3H-1,4-benzodiazepine-2-yl]-3-(ethoxycarbonyl)-urea;

1-[7-trifluoromethyl-5-(2,6-difluorophenyl)-3H-1,4-benzodiazepine-2-yl]-3-(ethoxycarbonyl)-urea;

1-[7-bromo-5-(o-bromophenyl)-3H-1,4-benzodiazepine-2-yl]-3-(ethoxycarbonyl)urea;

1-[7-cyano-5-(o-chlorophenyl)-3H-1,4-benzodiazepine-2-yl]-3-(ethoxycarbonyl)-urea;

1-[7-trifluoromethyl-5-(o-chlorophenyl)-3H-1,4-benzodiazepine-2-yl]-3-(ethoxycarbonyl)-urea;

1-[5-(o-chlorophenyl)-3H-1,4-benzodiazepine-2-yl]-3-(ethoxycarbonyl)-urea;

in the process of Example 1 can produce 9-nitro-7-phenyl-s-triazino[1,2-a][1,4]benzodiazepine-1,3-(2H,5H)-dione;

9-fluoro-7-phenyl-s-triazino[1,2-a][1,4]benzodiazepine-1,3(2H,5H)-dione;

7-(o-fluorophenyl)-5-methyl-s-triazino[1,2-a][1,4]benzodiazepine-1,3(2H,5H)-dione;

9-chloro-7-(2,6-difluorophenyl)-s-triazino[1,2-a][1,4]benzodiazepine-1,3(2H,5H)-dione;

7-(2,6-difluorophenyl)-9-trifluoromethyl-s-triazino[1,2-a][1,4]benzodiazepine-1,3(2H,5H)-dione;

9-bromo-7-(o-bromophenyl)-s-triazino[1,2-a][1,4]benzodiazepine-1,3(2H,5H)-dione;

7-(o-chlorophenyl)-9-cyano-s-triazino[1,2-a][1,4]benzodiazepine-1,3(2H,5H)-dione;

7-(o-chlorophenyl)-9-trifluoromethyl-s-triazino[1,2-a][1,4]benzodiazepine-1,3(2H,5H)-dione;

7-(o-chlorophenyl)-s-triazino[1,2-a][1,4]benzodiazepine-1,3(2H,5H)-dione.

EXAMPLE 2

9-chloro-4-methyl-7-phenyl-s-triazino[1,2-a][1,4]benzodiazepine-1,3(2H,4H)-dione

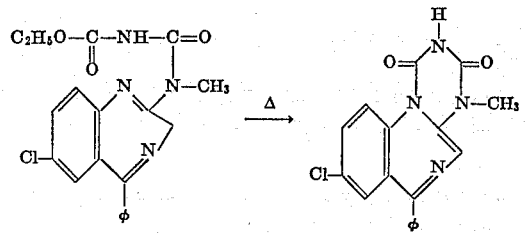

The crude 1-carbethoxy-3-(7-chloro-5-phenyl-3H-1,4-benzodiazepin-2-yl)-3-methylurea, preparation 2, was dissolved in 50 ml. of xylene and stirred under reflux, under $N_2$, for 20 hrs. After filtration the solution was cooled giving 5.23 g. of yellow crystalline solid, M.P. 236–241. This was recrystallized from 300 ml. of 80% aqueous EtOH yielding 4.6 g. of yellow crystals, M.P. 243–245°. IR, UV, NMR, mass spec. and TLC are in accord with the proposed structure.

*Analysis.*—Calcd. for $C_{18}H_{13}ClN_4O_2$ (percent): C, 61.24; H, 3.71; Cl, 10.04; N, 15.94. Found (percent): C, 60.71; H, 3.96; Cl, 9.96; N, 15.76.

Substitution of 1-carbethoxy-3-[7-chloro-5-o-bromophenyl-3H-1,4-benzodiazepine-2-yl]-3-methylurea;

1-carbethoxy-3-(7-chloro-5-phenyl-3H-1,4-benzodiazepine-2-yl)-allylurea;

1-carbethoxy-3-[7-chloro-5-(o-chlorophenyl)-3H-1,4-benzodiazepine-2-yl]-3-methylurea;

1-carbethoxy-3-(7-trifluoromethyl-5-phenyl-3H-1,4-benzodiazepine-2-yl)-3-methylurea;

1-carbethoxy-3-[7-nitro-5-(2,6-difluorophenyl)-3H-1,4-benzodiazepine-2-yl]-3-isopropylurea;

1-carbethoxy-3-[5-(o-chlorophenyl)-3H-1,4-benzodiazepine-2-yl]-3-methylurea;

1-carbethoxy-3-[7-chloro-5-(m-methoxyphenyl)-3H-1,4-benzodiazepine-2-yl]-3-methylurea;

in the process of Example 2 can produce 9-chloro-7-(o-bromophenyl)-4-methyl-s-triazino[1,2-a][1,4]benzodiazepine-1,3-(2H,4H)-dione;

9-chloro-7-phenyl-4-allyl-s-triazino[1,2-a][1,4]benzodiazepine-1,3(2H,4H)-dione;

9-chloro-7-(o-chlorophenyl)-4-methyl-s-triazino[1,2-a][1,4-]benzodiazepine-1,3(2H,4H)-dione;

9-trifluoromethyl-7-phenyl-4-methyl-s-triazino[1,2-a][1,4]benzodiazepine-1,3(2H,4H)-dione;

9-nitro-7-(2,6-difluorophenyl)-4-isopropyl-s-triazino-[1,2-a][1,4]benzodiazepine-1,3(2H,4H)-dione;

7-(o-chlorophenyl)-4-methyl-s-triazino[1,2-a][1,4]benzodiazepine-1,3(2H,4H)-dione;

9-chloro-5-(m-methoxyphenyl)-4-methyl-s-triazino-[1,2-a][1,4]benzodiazepines-1,3(2H,4H)-dione.

EXAMPLE 3

9 - chloro - 7 - methyl - 2 - phenyl - s - triazino[1,2-a][1,4]benzodiazepins - 1,3(2H,5H) - dione and cyclohexane solvate (3:1)

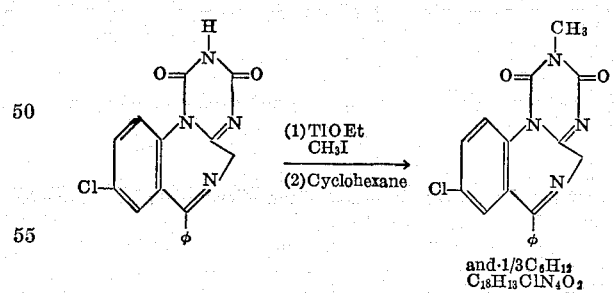

and·1/3$C_6H_{12}$
$C_{18}H_{13}ClN_4O_2$

To a solution of 1.92 g. (0.005 mole) of 9-chloro-7-phenyl - s - triazino[1,2-a][1,4]benzodiazepine - 1,3-(2H,5H)dione ethylacetate solvate (2:1) (Example 1) in 25 ml. of DMF under $N_2$ was added at room temperature with stirring 0.38 ml. (1.25 g., 0.005 mole) of TlOEt. To the resulting dark red solution was slowly added, dropwise with stirring, 0.312 ml. (0.005 mole) of MeI. The color slowly disappeared and solid separated. After stirring at room temperature for 4 hrs. the solution was filtered and the solid TlI was extd. with DMF. The DMF solution was poured into water and the product was extracted with ether. The ether solution was washed with water, dried over $Na_2SO_4$, filtered and evaporated giving 1.6 g. of solid which appeared by TLC and IR to be only slightly impure product. This was recrystallized from i-PrOH and then from a mixture of PhH and cyclohexane. The resulting solid was dried at 60°/0.5 mm. giving 0.6 g. of solid M.P. 120–167° (dec.). This was shown by TLC, IR, UV, NMR, VPC, and analysis to be nearly pure product with about ⅓ molecule of cyclohexane of crystallization.

*Analytical.*—Calcd. for $C_{18}H_{13}ClN_4O_2 \cdot ⅓ C_6H_{12}$ (percent: C, 53.08; H, 4.50; N, 14.71. Found (percent): C, 63.17; H, 4.52; N, 14.66.

Additional product was obtained from the filtrates by fractional crystallization from i-PrOH and PH-cyclohexane. This was dried at 100°/0.1 mm. giving 0.52 g. of nearly white solid, M.P. 211–213°. TLC, IR, and NMR showed this to be the same as above but purer and containing little if any cyclohexane.

PREPARATION 3

2-amino-7-chloro-5-(o-chlorophenyl)-1,4-benzodiazepine

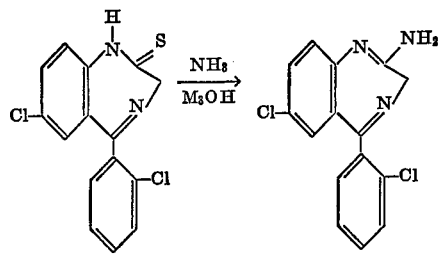

A suspension of 102 g. (0.318 mole) of 7-chloro-5-(o-chlorophenyl) - 2H - 1,4 - benzodiazepine-2-thione in 1800 ml. MeOH was cooled to −70° and $NH_3$ was bubbled through the mixture till it became saturated. The resulting solution was then stirred for 18 hrs. at room temperature. A yellowish white solid separated which was filtered and air dried giving 43 g. of desired product, M.P. 228–230° (dec.). The filtrate from above was concentrated and cooled gave 45 g. more of the desired product, M.P. 213–218° (dec.). This second crop was recrystallized from a mixture of MeOH and $CH_2Cl_2$ giving 41 g. of crystalline compound, M.P. 222–226° (dec.). IR supported the proposed structure.

PREPARATION 4

1-(carbethoxy)-3-[7-chloro-5-(o-chlorophenyl)-3H-1,4-benzodiazepin-2-yl]urea

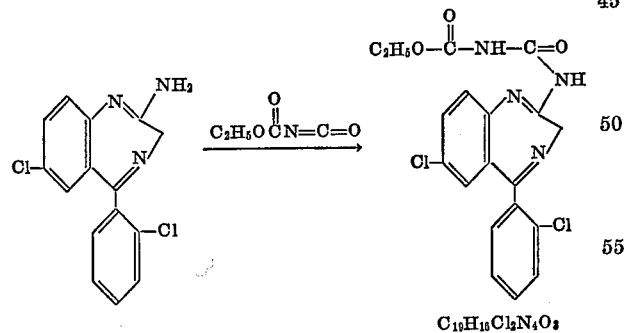

A solution of 3.04 g. (0.01 mole) of 2-amino-7-chloro-5 - (o - chlorophenyl) - 3H-1,4-benzodiazepine in 100 ml. of diethyleneglycol dimethyl ether (made by warming) was cooled to −76° by Dry Ice-acetone under $N_2$ and 5 ml. (0.04 mole) of carbethoxy isocyanate was added dropwise with stirring during 20 min. After stirring at −76° for 1 hr. the solution was allowed to warm to room temperature and was stirred under $N_2$ for 2 hrs. Evaporation at 40°/1 mm. and addn. of ether gave 2.9 g. of nearly white solid, M.P. 173–175°. Recrystallization from EtOH yielded 2.32 g. (55.4%) of white crystals, M.P. 174–175. TLC showed one spot and IR and NMR confirmed the structure.

*Analysis.*—Calcd. for $C_{19}H_{16}Cl_2N_4O_3$ (percent): C, 54.43; H, 3.85; Cl, 16.91; N, 13.36. Found (percent): C, 54.52; H, 3.79; Cl, 16.96; N, 13.60.

EXAMPLE 4

9 - chloro - 7 - (o - chlorophenyl) - s - triazino[1,2 - a][1,4]benzodiazepine-1,3(2H,5H)-dione

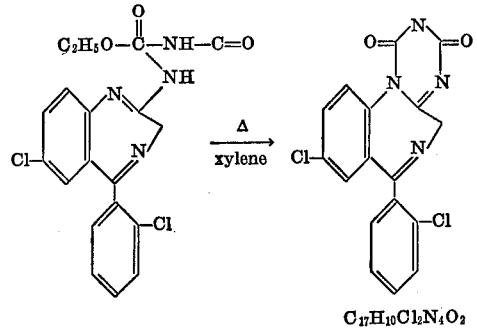

A solution of 0.63 g. (0.0015 mole) of 1-carbethoxy-3-[7 - chloro - 5(o - chlorophenyl) - 3H - 1,4 - benzodiazepin-2-yl]-urea in 25 ml. of xylene, under $N_2$, was stirred under reflux for 2.5 hrs. using a short air cooled condenser. By this time considerable product had separated from the boiling solution. After standing at room temperature overnight the solid was collected, washed with xylene and abs. ether and dried yielding 0.39 g. (69.5%) of fluffy needles, M.P. 247–251° (with darkening from 237° up). TLC, IR, AND NMR indicated this was nearly pure product of the proposed structure.

A sample for analysis was fractionally crystallized from $THF-H_2O$ giving while crystalline solid that appeared to be a solvate. This was boiled with xylene which changed the crystalline form but did not dissolve the material. It was collected, washed with xylene and ether and dried at 100°/<0.1 mm. for 18 hrs. giving white solid whose IR was identical with the above material directly out of the xylene reaction mixture, M.P. 250–254° (decompn. with darkening from 227° up). IR, UV, NMR and mass spec. are consistent with the proposed structure.

*Analysis.*—Calcd. for $C_{17}H_{10}Cl_2N_4O_2$ (percent): C, 54.71; H, 2.70; Cl, 19.00; N, 15.01. Found (percent): C, 54.88; H, 2.98; Cl, 18.85; N, 14.62.

EXAMPLE 5

9 - chloro - 7 - (o - chlorophenyl) - 2,4 - dimethyl - s - triazidino[1,2 - a][1,4] - benzodiazepine - 1,3(2H,4H)-dione and 9-chloro-7-(o-chlorophenyl)-2,5-dimethyl-s-triazino[1,2-a][1,4]benzodiazepine-1,3(2H,5H)-dione

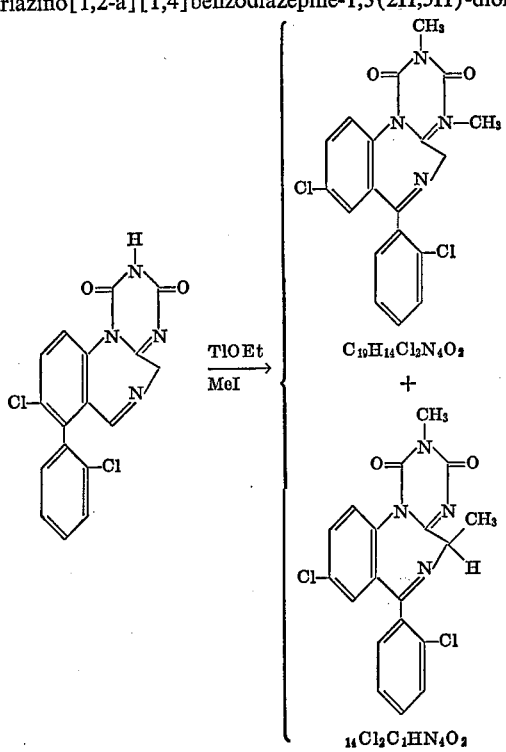

To a solution of 1.49 g. (0.004 mole) of 9-chloro-7-(o-chlorophenyl) - s - triazino[1,2 - a][1,4]benzodiazepine-1,3(2H,5H)-dione in 25 ml. of DMF, under $N_2$, was added was stirring 0.302 ml. (1.0 g., 0.004 mole) of TlOEt at room temperature. The solution became dark red and after stirring a few minutes 0.25 ml. (0.004 mole) of MeI was added. The solution was stirred under $N_2$ for during which solid separated and the color became lighter (but still red). Then 0.25 ml. more MeI was added and the color soon faded to a light an. After 30 minutes the solution was filtered from the solid TlI which was well extd. with DMF. The yellow tan solution was partly evaporated in vacuo below 50° and diluted with water. The resulting solid was collected, well washed with water and dried giving 1.2 g. of lt. yellow solid. TlC ($SiO_2$, 20% MeOH in $\phi$H or 60% EtOAc in cyclohexane) showed two main spots and two minor spots. This was dissolved in EtOAc and on standing crystals separated giving 0.25 g. of light yellow solid showing one spot on TLC, M.P. 237–239° C. Recrystallization from EtOAc yielded 0.16 g. of yellow crystals, M.P. 239–240. NMR, IR and UV indicated this had the first structure above.

Analysis—Calcd. for $C_{19}H_{14}Cl_2N_4O_2$ (percent): C, 56.87; H, 3.53; Cl, 17.67; N, 13.96. Found (percent): C, 56.88; H, 3.56; Cl, 17.80; N, 13.75.

The EtOAc filtrate from the first cryst. of the above was chromatographed on 100 g. of $SiO_2$ and eluted with 40 ml. portions of 50% EtOAc in cyclohexane. Fractions 4–8 contained more of the above compound. After evaporation of the solvent this was combined with the filtrate from the second crystallization above and recrystallized from EtOAc giving 0.22 g. of yellow crystals, M.P. 237–239°. The total yield was 0.38 g. (23%).

Column fractions 10–17 contained a second compound. Evaporation yielded 0.2 g. of nearly white solid. This was recryst. from i-PrOH yielding 0.18 g. of white needles, M.P. 226–228.5° NMR, IR, and anal. showed this to have the second structure above.

Analysis.—Calcd. for $C_{19}H_{14}Cl_2N_4O_2$ (percent): C, 56.87; H, 3.52; Cl, 17.67; N, 13.96. Found (percent): C, 56.96; H, 3.56; Cl, 17.79; N, 14.01.

I claim:

1. s-Triazino[1,2 - a][1,4]benzodiazepine - 1,3(2H,4H and 2H,5H)diones of the formula (X)

in which

R and $R_1$=H, alkyl or alkenyl of 1 to 4 carbon atoms,
$R_2$=H or alkyl of 1 to 3 carbon atoms, OH, acetoxy or propionoxy
$R_3$=2-, 3- or 4-pyridyl, 2-pyrimidyl, furyl, pyrryl, thenyl, cycloalkyl of 5 to 7 carbon atoms, cycloalkenyl of 5 to 7 carbon atoms, or $R_4$ and $R_5$=H, alkyl of 1 to 3 carbon atoms, halogen, nitro, cyano, trifluoromethyl, alkoxy of 1 to 3 carbon atoms, alkylthio of 1 to 3 carbon atoms, alkylsulfinyl of 1 to 3 carbon atoms, alkylsulfonyl of 1 to 3 carbon atoms, amino, alkanoylamino of 2 to 3 carbon atoms, or dialkylamino with 1 to 3 carbon alkyls, and the dashed bonds represents alternative positions of the double bond, $R_1$ being absent when it is attached to the N, and their pharmacologically acceptable acid addition salts.

2. A compound according to claim 1, having the formula:

in which

R and $R_1$=H, alkyl or alkenyl of 1 to 4 carbon atoms
$R_2$=H or alkyl of 1 to 3 carbon atoms, OH, acetoxy or propionoxy
$R_3$=2-, 3- or 4-pyridyl, 2-pyrimidyl, furyl, pyrryl, thenyl, cycloalkyl of 5 to 7 carbon atoms, cycloalkenyl of 5 to 7 carbon atoms or $R_4$ and $R_5$=H, alkyl of 1 to 3 carbon atoms, halogen, nitro, cyano, trifluoromethyl, alkoxy of 1 to 3 carbon atoms, alkylthio of 1 to 3 carbon atoms, alkylsulfinyl of 1 to 3 carbon atoms, alkylsulfonyl of 1 to 3 carbon atoms, amino, alanoylamino of 2 to 3 carbon atoms, or dialkylamino with 1 to 3 carbon alkyls, and their pharmacologically acceptable acid addition salts.

3. A compound according to claim 1, having the formula:

in which

R=H, alkyl or alkenyl of 1 to 4 carbon atoms,
$R_2$=H or alkyl of 1 to 3 carbon atoms, OH, acetoxy or propionoxy
$R_3$=2-, 3- or 4-pyridyl, 2-pyrimidyl, furyl, pyrryl, thenyl, cycloalkyl of 5 to 7 carbon atoms, cycloalkenyl of 5 to 7 carbon atoms, or $R_4$ and $R_5$=H, alkyl of 1 to 3 carbon atoms, halogen, nitro, cyano, trifluoromethyl, alkoxy of 1 to 3 carbon atoms, alkylthio of 1 to 3 carbon atoms, alkylsulfinyl of 1 to 3 carbon atoms, alkylsulfonyl of 1 to 3 carbon atoms, amino, alkanoylamino of 2 to 3 carbon atoms, or dialkylamino with 1 to 3 carbon alkyls, and their pharmacologically acceptable acid addition salts.

4. A compound according to claim 1 of the formula:

5. A compound according to claim 1, of the formula:

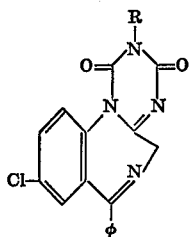

in which R=H, alkyl or alkenyl of 1 to 4 carbon atoms.

6. A compounds according to claim 1, of the formula:

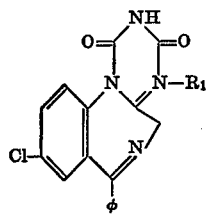

in which $R_1$=H, alkyl or alkenyl of 1 to 4 carbon atoms.

7. A compound according to claim 1, of the formula:

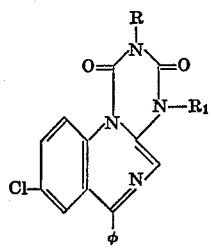

in which R and $R_1$=H, alkyl or alkenyl of 1 to 4 carbon atoms.

8. A compound according to claim 1, 9-chloro-7-phenyl - s - triazino[1,2-a][1,4]benzodiazepine-1,3(2H,5H)dione ethylacetate.

9. A compound according to claim 1, 9-chloro-4-methyl-7-phenyl - s - triazino[1,2 - a][1,4]benzodiazepine-1,3-(2H,4H)dione.

10. A compound according to claim 1, 9-chloro-7-methyl - 7 - phenyl - s - triazino[1,2-a][1,4]benzodiazepins-1,3-(2H,5H)dione.

11. A compound according to claim 1, 9-chloro-7-(o-chlorophenyl)-s - triazino[1,2-a][1,4]benzodiazepins-1,3-(2H,5H)dione.

12. A compound according to claim 1, 9-chloro-7-(o-chlorophenyl) - 2,4 - dimethyl - s - triazidino[1,2 - a][1,4]benzodiazepine-1,3(2H,4H)dione.

13. A compound according to claim 1, 9-chloro-7-(o-chlorophenyl)-2,5-dimethyl - s - triazino[1,2-a][1,4]benzodiazepine-1,3(2H,5H)dione.

14. A method for the preparation of a compound of the formula:

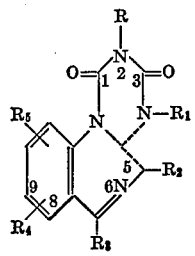

in which

R and $R_1$=H, alkyl or alkenyl of 1 to 4 carbon atoms,
$R_2$=H or alkyl of 1 to 3 carbon atoms, OH, acetoxy or propionoxy
$R_3$=2-, 3- or 4-pyridyl, 2-pyrimidyl, furyl, pyrryl, thenyl, cycloalkyl of 5 to 7 carbon atoms, cycloalkenyl of 5 to 7 carbon atoms, or

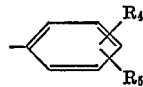

$R_4$ and $R_5$=H, alkyl of 1 to 3 carbon atoms, halogen, nitro, cyano, trifluoromethyl, alkoxy of 1 to 3 carbon atoms, alkylthio of 1 to 3 carbon atoms, alkylsulfinyl of 1 to 3 carbon atoms, alkylsulfonyl of 1 to 3 carbon atoms, amino, alkanoylamino of 2 to 3 carbon atoms, or dialkylamino with 1 to 3 carbon alkyls, and the dashed bonds represent alternative positions of the double bond, $R_1$ being absent when it is attached to the N, which comprises heating a compound of the formula

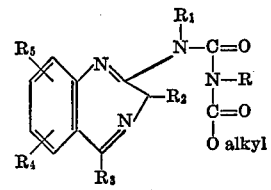

(IV)

in which

R=H, alkyl or alkenyl of 1 to 4 carbon atoms,
$R_2$=H or alkyl of 1 to 3 carbon atoms, OH, acetoxy or propionoxy
$R_3$=2-, 3- or 4-pyridyl, 2-pyrimidyl, furyl, pyrryl, thenyl, cycloalkyl of 5 to 7 carbon atoms, cycloalkenyl of 5 to 7 carbon atoms, or

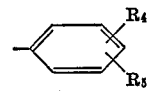

$R_4$ and $R_5$=H, alkyl of 1 to 3 carbon atoms, halogen, nitro, cyano, trifluoromethyl, alkoxy of 1 to 3 carbon atoms, alkylthio of 1 to 3 carbon atoms, alkylsulfinyl of 1 to 3 carbon atoms, alkylsulfonyl of 1 to 3 carbon atoms, amino, alkanoylamino of 2 to 3 carbon atoms, or dialkylamino with 1 to 3 carbon alkyls, to effect ring closure.

15. A method for the preparation of a compound of the formula:

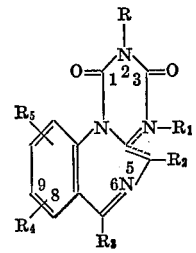

(X)

in which

R and $R_1$=H, alkyl or alkenyl of 1 to 4 carbon atoms,
$R_2$=H or alkyl of 1 to 3 carbon atoms, OH, acetoxy or propionoxy
$R_3$=2-, 3- or 4-pyridyl, 2-pyrimidyl, furyl, pyrryl, thenyl, cycloalkyl of 5 to 7 carbon atoms, cycloalkenyl of 5 to 7 carbon atoms, or

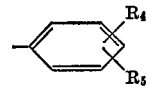

$R_4$ and $R_5$=H, alkyl of 1 to 3 carbon atoms, halogen, nitro, cyano, trifluoromethyl, alkoxy of 1 to 3 carbon atoms, alkylthio of 1 to 3 carbon atoms, alkylsulfonyl of 1 to 3 carbon atoms, amino, alkanoylamino of 2 to 3 carbon atoms, or dialkylamino with 1 to 3 carbon alkyls. And the dashed bonds represent alternative positions of the double bond, $R_1$ being absent when it is attached to the N, which comprises heating a compound of the formula:

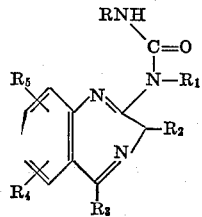

in the presence of a member of the group consisting of ClCOCl, 1,1'-carbonyldiimidazole, 1,1'-carbonyl ditriazole and $(\phi O)_2 CO$.

References Cited

FOREIGN PATENTS 568,674  1/1959  Canada.

JOHN M. FORD, Primary Examiner

U.S. Cl. X.R.

260—239 BD; 99—2 G; 424—249

UNITED STATES PATENT OFFICE
CERTIFICATE OF CORRECTION

Patent No. 3,773,765       Dated November 20, 1973

Inventor(s) Robert Bruce Moffett

It is certified that error appears in the above-identified patent and that said Letters Patent are hereby corrected as shown below:

Column 8, line 35, "HONO" should read -- HCNO --. Column 8, line 56, "dimethyl, ether," should read -- dimethyl ether, --. Column 8, line 61, "mixture may be much below room temperature (e.g., -78°)" should read -- mixture is stirred or allowed to stand at room temperature --. Column 10, line 10 " $\overset{O}{\underset{\|}{C}}$ " should read -- $C_2H_5O-\overset{O}{\underset{\|}{C}}-NH$ --. Column 10, line 71 "(2) EtOAe" should read -- $C_2H_5O\overset{O}{\underset{\|}{C}}C-NH$ (2) EtOAc --. Column 10, line 72 ".¹/₂EtOAɔ" should read -- .¹/₂EtOAc --.

Column 13, line 6 "53.08" should read -- 63.08 --. Column 14, line 5 " $\overset{NO}{\underset{}{\diagup\diagdown}}$ " should read -- $\overset{H}{\underset{\diagup N \diagdown}{|}}$ --. Column 14, line 27 "AND" should read -- and --

Column 14, line 30 "while" should read -- white --. Column 14, line 50 " 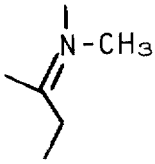 " should read --  --.

UNITED STATES PATENT OFFICE
CERTIFICATE OF CORRECTION

Patent No. 3,773,765  Dated November 20, 1973

Inventor(s) Robert Bruce Moffett

It is certified that error appears in the above-identified patent and that said Letters Patent are hereby corrected as shown below:

Column 14, lines 55-68, the formula should appear as shown below instead of as in the patent:

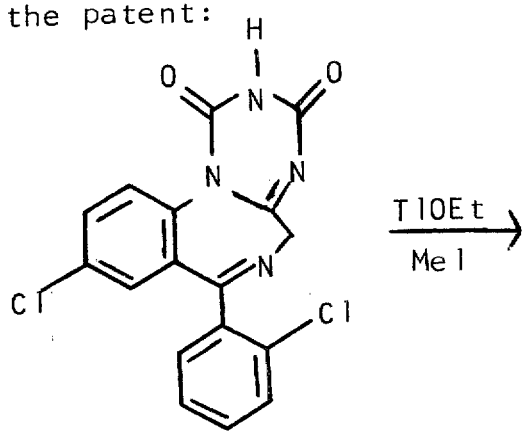

Column 14, line 75, "$_{14}Cl_2C_1HN_4O_2$" should read -- $C_{19}H_{14}Cl_2N_4O_2$ -- Column 15, line 10, "an" should read -- tan --. Column 15, line 50, " 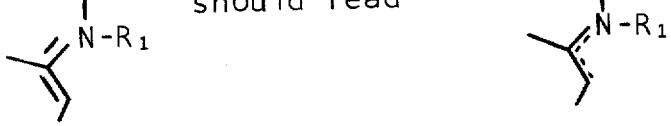 " should read --. Column 16, line 10, "$R_2$" should read -- $R_1$ --. Column 17, line 43, "ethylacetate." should read -- ethyl acetate solvate. --. Column 17, line 48, "benzodiazepins-" should read -- benzodiazepine- --. Column 17, line 51, "benzodiazepins-" should read -- benzodiazepine- --. Column 17, line 54, "triazidino" should read -- triazino --. Column 17, lines 65-68, " 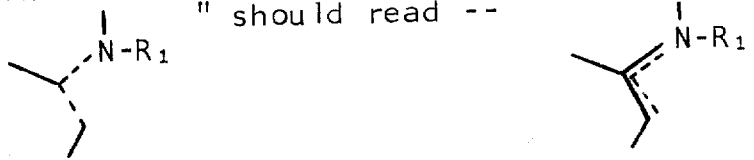 " should read -- --.

UNITED STATES PATENT OFFICE
CERTIFICATE OF CORRECTION

Patent No. 3,773,765              Dated November 20, 1973

Inventor(s) Robert Bruce Moffett

It is certified that error appears in the above-identified patent and that said Letters Patent are hereby corrected as shown below:

Column 19, line 10, "  " should read --  --.

Signed and sealed this 24th day of December 1974.

(SEAL)
Attest:

McCOY M. GIBSON JR.
Attesting Officer

C. MARSHALL DANN
Commissioner of Patents